3,015,667
HYDROGENATION PROCESS
Lukas Hans Ruiter and Johannes Martinus Van Schaik, Vlaardingen, Netherlands, assignors to Lever Brothers Company, New York, N.Y., a corporation of Maine
No Drawing. Filed Jan. 15, 1960, Ser. No. 2,589
Claims priority, application Great Britain Jan. 23, 1959
7 Claims. (Cl. 260—409)

This invention relates to a process for hydrogenating unsaturated fatty acids.

The hydrogenating of unsaturated higher fatty acids is usually carried out in the liquid phase in the presence of a catalyst, for instance a nickel catalyst, using a superatmospheric pressure. The hydrogenation can also be carried out in the vapor phase but it is found that processes of this kind tend to give products containing substantial amounts of unsaponifiable substances. These substances are evidently produced by a side-reaction in which reduction of the carboxylic acid group occurs, and the tendency for this side-reaction to take place increases with increasing temperature of hydrogenation: at relatively high temperatures the amount of unsaponifiable substances in the product may be as high as 20 or 30%.

It has now been discovered that this tendency to form unwanted by-products, namely, unsaponifiable matter, can be reduced or suppressed by carrying out the hydrogenation in the presence of water vapor. Moreover, when certain catalysts, for instance nickel catalysts, are employed in the hydrogenation, the presence of the water vapor in the hydrogenation vapor mixture has been found to increase the activity of the catalysts, and also to lengthen their life.

The process of the invention is accordingly one for hydrogenating an unsaturated fatty acid, in which the hydrogenation is carried out in the vapor phase in the presence of water vapor.

The unsaturated fatty acid is preferably one containing from 10 to 24 carbon atoms, and examples of suitable acids are oleic, linoleic and linolenic acids. Mixtures of unsaturated fatty acids from natural oils can also be used as starting materials.

In practice the water vapor is introduced into the hydrogenation vapor mixture before the mixture contacts the catalyst employed. The amount of water vapor relative to hydrogen which is suitable for use in the process will depend to some extent upon the particular process conditions employed, but the amount necessary to achieve some reduction in the amount of unsaponifiable materials produced is not critical. The amount of water vapor used should not be so small as to have a negligible effect, but on the other hand the use of a very large quantity may in some instances affect adversely the activity and life of the catalyst employed. Preferably from 2 to 200, and most suitably from 5 to 50 molecules of water vapor are present for each 100 molecules of hydrogen employed in the hydrogenation vapor mixture; that is to say, this amount is present in the vapor mixture containing hydrogen and fatty acid as it enters the catalyst and before hydrogenation occurs.

Although a fixed bed catalyst can be used, the hydrogenation is preferably effected with a fluidized catalyst. The speed and course of the hydrogenation will depend in any given instance on the hydrogenation temperature which is employed (that is, the temperature at which the vapor mixture enters the catalyst), and the relative amounts of hydrogen and fatty acid present in the hydrogenation vapor mixture. The hydrogenation temperature employed will depend to some extent upon the particular hydrogenation pressure and the size of the fatty acid molecule used. The hydrogenation pressure (that is, the pressure at which the vapor mixture enters the catalyst), is preferably one within the range of from 600 to 2280 mm. of mercury, and it is usually convenient to operate at hydrogenation pressures of from 760 to 900 mm. However, reduced pressures can be employed if desired, especially when using a fluidized catalyst as described in U.S. patent application, Serial No. 766,728, filed October 13, 1958, relating to a Hydrogenation Process. Usually the partial pressure of fatty acid in the vapor mixture used is from 10 to 40 mm. The combined amount of hydrogen and water vapor present in the vapor mixture is then usually within the range of from 20 to 200 molecules for each molecule of fatty acid. A hydrogenation temperature of above 150° C. is required in practice. When unsaturated fatty acids having from 10 to 24 carbon atoms in the molecule are to be hydrogenated, the hydrogenation temperature is conveniently within the range of from 200° to 280° C. for a wide range of hydrogenation pressures.

Depending upon the precise conditions used, the hydrogenation may be partial (in which case it may also be selective), or it may be complete. The degree of hydrogenation is of course influenced by the time of contact of the vapor mixture with the catalyst.

Catalysts of the type generally employed for hydrogenating unsaturated fatty acids can be used, and nickel and palladium catalysts are especially suitable. Using a fluidized bed, the catalyst needs to be in a sufficiently finely-divided state to be suitable for fluidization. The catalyst particle size will then be sufficiently large to minimize the loss of catalyst by removal with the gases issuing from the reactor where hydrogenation takes place unless a moving bed technique is used, in which catalyst is carried out of the reactor by the gases, recovered and recirculated to the base of the reactor. A suitable form of catalyst for use in a fluidized bed is one in which the catalytic material is deposited by precipitation or by impregnation on the surface of particles of a carrier of suitably light inert material, for instance, alumina or silica. Such a carrier can suitably have a particle size of between 60 and 120 microns diameter, but larger and heavier particles can be used for fast-moving vapor mixtures when a higher throughput is required. Particularly good results have been obtained using a catalyst of nickel deposited by precipitation or by impregnation on silica as a carrier.

It is preferable to remove dissolved air from the unsaturated fatty acid starting material before it is vaporized for the hydrogenation, so that polymerization or other side-reactions which might otherwise occur are avoided.

A convenient procedure for carrying out the process of the invention is as follows. A measured quantity of hydrogen is passed into water at a temperature suitable for the hydrogen to emerge with the water vapor content required. The moist hydrogen is then passed through a vaporizer containing the unsaturated fatty acid maintained at a sufficiently high temperature to provide the content of acid in the vapor mixture required for hydrogenation. The temperature of the vapor mixture thus obtained is adjusted to hydrogenation temperature as necessary and the mixture led into the reactor containing the catalyst, which is maintained at hydrogenation temperature by a suitable bath. When a fluidized catalyst is used, the vapor mixture can enter the bottom of the reactor, passing through a vapor-permeable base over which the catalyst is maintained in a fluidized state. After passing through the reactor, any entrained catalyst particles are removed by suitable means and the mixture is led to a condenser where the fatty acid product is condensed out, then to a second condenser where water is removed, and the unused hydrogen is recirculated by a compressor.

When using oleic acid as starting material it is suitable to pass the hydrogen laden with water vapor at a slight positive pressure into the fatty acid vaporizer maintained at 225° C., to adjust the temperature of the vapor mixture containing fatty acid, hydrogen and steam to 260° C. by an oil bath which maintains the reactor at that temperature, and to condense out the product and water in condensers maintained at 60°–70° C. and 0° C. respectively.

The invention is illustrated by the following examples, in which the flow of hydrogen gas is expressed in litres per hour at normal temperature and pressure.

*Example 1*

Technical oleic acid having an iodine number of 95, an acid number of 199, and containing 0.9% of unsaponifiable matter was hydrogenated on a small scale using the procedure described above. The reactor used contained 8 grams of a fluidized nickel-on-silica catalyst. Hydrogen was passed at a rate of 53 litres per hour through water maintained at 90° C., and then through the oleic acid maintained at 225° C.: the vapor mixture obtained was heated to 260° C. and passed through the reactor maintained at the same temperature. The hydrogenation pressure was 800 mm. of mercury, and hydrogenation was continued for a period of 6½ hours. 53 litres of hydrogen, 54 grams of water and 20.8 grams of oleic acid passed into the reactor every hour, so that about one hundred molecules of water were present for each one hundred molecules of hydrogen, and a total of about 75 molecules of hydrogen and water were present for each molecule of oleic acid.

After every hour samples of the product being formed were tested by determination of the iodine number. A total of 135 grams of hydrogenated oleic acid was collected, and the iodine number, acid value and content of unsaponifiable substances in the product as a whole was determined.

A similar process was carried out using no water vapor: 126 litres per hour of hydrogen was used to hydrogenate 19.3 grams of oleic acid per hour, and in 6½ hours 125 grams of hydrogenated oleic acid was collected: tests were carried out as before.

The results were as follows:

| Time of taking sample (hr.) | Iodine number of hydrogenation product | |
|---|---|---|
| | Using water | Without use of water |
| 1 | 5 | 6 |
| 2 | 6 | 6 |
| 3 | 7 | 7 |
| 4 | 9 | 9 |
| 5 | 10 | 10 |
| 6 | 11 | 12 |
| 6½ | 10 | 13 |

| Total product | Iodine number | Acid value | Unsaponifiables, percent |
|---|---|---|---|
| Using water | 7 | 201 | 1.7 |
| Without use of water | 9 | 170 | .15 |

*Example 2*

Technical oleic acid was hydrogenated as in Example 1, but under different conditions. The fluidized catalyst employed was of nickel on silica (13 grams). Hydrogen was passed at a rate of 83 litres per hour through water maintained at 80° C. and then through oleic acid at 225° C.: the vapor mixture obtained was heated to 260° C. and passed through the reactor at that temperature, the hydrogenation pressure being 850 mm. 83 litres of hydrogen, 39 grams of water and 18.3 grams of oleic acid passed into the reactor every hour, so that about 50 molecules of water were present for every 100 molecules of hydrogen and a total of 100 molecules of hydrogen and water were present for each molecule of oleic acid. The hydrogenation was carried on for 6 hours, after which 110 grams of product had collected. Samples were tested as before.

In a comparative experiment in which no water was used, 126 litres of hydrogen and 17.8 grams of oleic acid were passed into the reactor per hour for 6 hours and 107 grams of product was collected: tests were carried out as before.

The results were as follows:

| Time of taking sample (hr.) | Iodine number of hydrogenation product | |
|---|---|---|
| | Using water | Without use of water |
| 1 | 2 | 5 |
| 2 | 2 | 5 |
| 3 | 2 | 5 |
| 4 | 2 | 5 |
| 5 | 2 | 5 |
| 6 | 2 | 6 |

| Total product | Iodine number | Acid number | Unsaponifiables, percent |
|---|---|---|---|
| Using water | 2 | 195 | 4.4 |
| Without use of water | 5 | 160 | 20 |

*Example 3*

Fish oil fatty acids (iodine number 136.8, acid number 202.0) were hydrogenated as in Example 1, but under different conditions. The fluidized catalyst employed was of nickel on silica (32 g.). Hydrogen was passed at a rate of 210 litres per hour through water maintained at 50° C. and then through an evaporator at 300° C. containing the fatty acids. The vapor mixture obtained was heated to 220° C. and passed through the reactor at that temperature, the hydrogenation pressure being 800 mm. 210 litres of hydrogen, 18 g. of water and 25 g. of the fatty acids passed into the reactor every hour, about one molecule of water being present for every nine molecules of hydrogen, and a total of 122 molecules of hydrogen and water being present for each molecule of the fish fatty acids. The hydrogenation was carried on for 7 hours, after which 175 g. of hydrogenated product had collected. Samples were tested as before.

In a comparative experiment in which no water was used, 240 litres of hydrogen and 25 g. of the fish oil fatty acids were passed into the reactor per hour for 7 hours, and 175 g. of hydrogenated product was collected: tests were carried out as before.

The results were as follows:

| Time of taking sample (hr.) | Iodine number of hydrogenation product | |
|---|---|---|
| | Using water | Without use of water |
| 1 | 4 | 5 |
| 2 | 4 | 8 |
| 3 | 8 | 15 |
| 4 | 7 | 18 |
| 5 | 6 | 23 |
| 6 | 5 | 26 |
| 7 | 9 | 28 |

| Total product | Iodine number | Acid number | Unsaponifiables, |
|---|---|---|---|
| Using water | 8 | 197 | 2.1 |
| Without use of water | 17 | 188 | 7.4 |

Example 4

The fish oil fatty acids were hydrogenated as in Example 1, but under different conditions. The fluidized catalyst employed was of nickel on silica (32 g.). Hydrogen was passed at a rate of 210 litres per hour through water maintained at 50° C. and then through an evaporator at 300° C. containing the fatty acids. The vapor mixture obtained was heated to 240° C. and passed through the reactor at that temperature, the hydrogenation pressure being 800 mm. 210 litres of hydrogen, 18 g. of water and 30 g. of the fatty acids passed into the reactor every hour, about one molecule of water being present for every nine molecules of hydrogen, and a total of 102 molecules of hydrogen and water being present for each molecule of the fish fatty acids. The hydrogenation was carried on for 7 hours, after which 210 g. of hydrogenated product had collected. Samples were tested as before.

In a comparative experiment in which no water was used, 240 litres of hydrogen and 30 g. of the fish oil fatty acids were passed into the reactor per hour for 7 hours, and 210 g. of hydrogenated product was collected: tests were carried out as before.

The results were as follows:

| Time of taking sample (hr.) | Iodine number of hydrogenation product | |
|---|---|---|
| | Using water | Without use of water |
| 1 | 4 | 5 |
| 2 | 6 | 8 |
| 3 | 9 | 18 |
| 4 | 12 | 21 |
| 5 | 12 | 24 |
| 6 | 12 | 25 |
| 7 | 9 | 30 |

| Total product | Iodine number | Acid number | Unsaponifiables, |
|---|---|---|---|
| Using water | 9 | 197 | 3.8 |
| Without use of water | 16 | 171 | 15.3 |

We claim:
1. A process for hydrogenating unsaturated higher fatty acids in the vapor phase, the improvement in which comprises carrying out hydrogenation with a mixture of water vapor and hydrogen, in which mixture the molecular proportion of water vapor to hydrogen is within the range of from 2:100 to 200:100.
2. A process according to claim 1, in which said mixture contains a molecular proportion of water vapor to hydrogen within the range of from 5:100 to 50:100.
3. A process according to claim 1, in which the hydrogenation is carried out using a fluidised catalyst.
4. A process according to claim 1, in which the unsaturated fatty acid is one having from 10 to 24 carbon atoms.
5. A process according to claim 1, in which the unsaturated fatty acid is oleic acid.
6. A process according to claim 1, in which a mixture of unsaturated higher fatty acids from natural oils is hydrogenated.
7. A process for hydrogenating unsaturated higher fatty acids comprising the steps of introducing a vaporised mixture of water, hydrogen and unsaturated higher fatty acid into a reactor containing a hydrogenating catalyst, in which mixture the molecular proportion of water vapor to hydrogen is within the range of from 2:100 to 200:100, and subsequently condensing the hydrogenated fatty acid product and water from the resultant mixture, leaving the hydrogen for recirculation.

No references cited.